May 7, 1963  R. R. DAVISON ET AL  3,088,909
MIXED SOLVENTS FOR SALINE WATER EXTRACTION
Filed Feb. 9, 1961  2 Sheets-Sheet 2
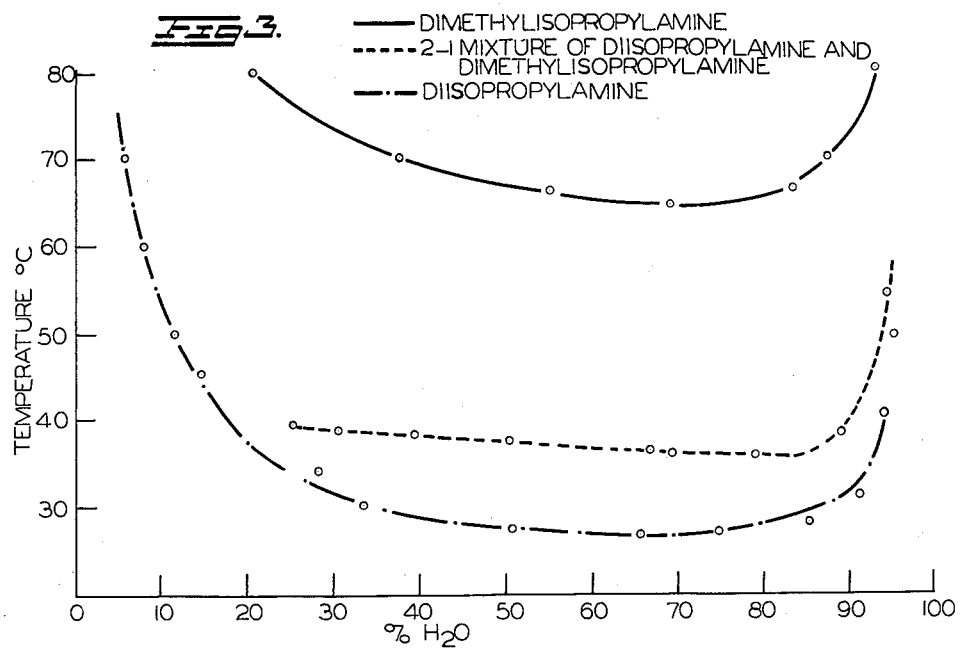
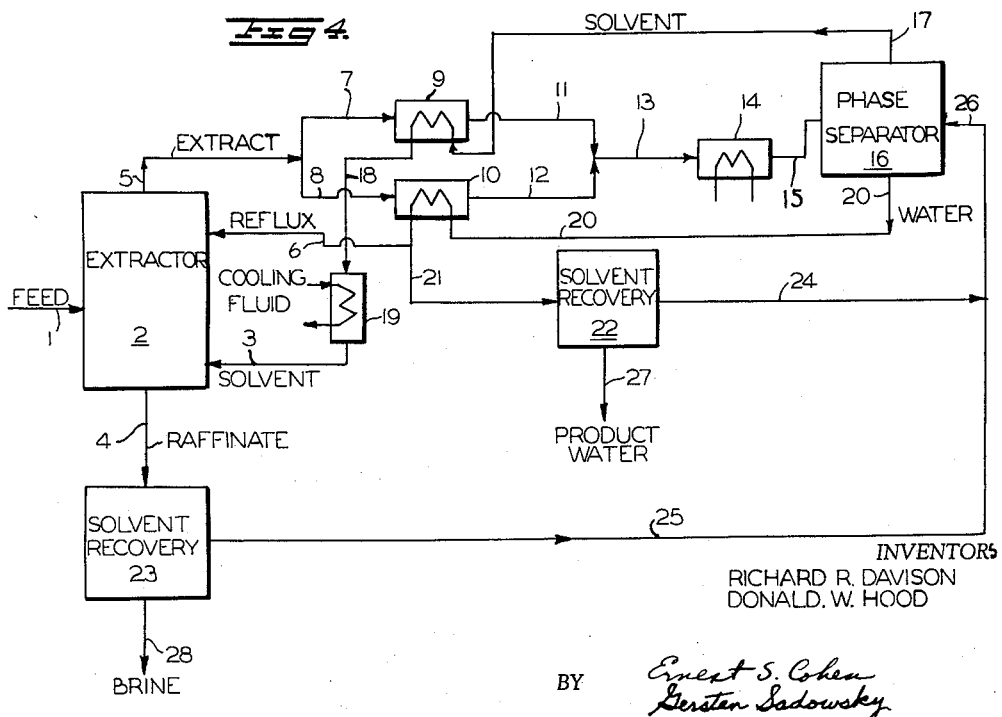
INVENTORS
RICHARD R. DAVISON
DONALD. W. HOOD
BY Ernest S. Cohen
Gersten Sadowsky
ATTORNEY

United States Patent Office 3,088,909
Patented May 7, 1963

3,088,909
MIXED SOLVENTS FOR SALINE WATER EXTRACTION
Richard R. Davison and Donald W. Hood, College Station, Tex., assignors to the United States of America as represented by the Secretary of the Interior
Filed Feb. 9, 1961, Ser. No. 88,237
16 Claims. (Cl. 210—22)

The invention herein described and claimed may be manufactured and used by or for the Government of the United States of America for governmental purposes without the payment of royalties thereon or therefor.

This invention relates to the solvent extraction of water from saline solutions, and more particularly to the solvents employed therein. "Saline waters" includes brackish waters, sea water, and in general salt solutions of any kind in which the solvent system is compatible.

Recently a method for the recovery of fresh water from saline waters employing various solvents, especially amines, has been proposed. See, for example, the article by Davison and Hood in Saline Water Conversion, publication (1958), pp. 408–416, 568, National Academy of Science-National Research Council; and the article in Chemical and Engineering News, Feb. 2, 1959, pp. 40, 42.

Essentially, the method consists in employing solvents which have a large change in solubility for water at different temperatures, and which contain strong electro-negative atoms within the molecule that have the property of forming hydrogen bonds with water molecules. However, the presence of hydrophobic side chains in the solvent molecule draw the water-solvent couple into the solvent phase.

The operability of this process rests in the shape of the partial miscibility curves which the effective solvents exhibit with water, as will be explained more fully below, and the favorable distribution of salt between the extract and raffinate phases. By contacting the solvent and saline water at the correct temperature for the particular solvent employed, a raffinate phase containing more salt than the feed and an extract phase containing considerable water and relatively little salt are formed. On heating the extract phase to the proper temperature, a fresh water phase separates and the solvent may be recycled.

To be effective, a solvent must exhibit sharp solubility changes with temperature and have a high selectivity for water over salt. Selectivity is defined as the salt content of the raffinate phase divided by the salt content of the extract phase in equilibrium with the extract phase, i.e., $$\frac{\text{Salt content raffinate in percent}}{\text{Salt content extract in percent}}$$

For example, if the raffinate has 1% salt and the extract 0.2%, the selectivity is 5. High selectivity results in fewer stages, and lower reflux rates, and hence less solvent requirements. Secondary and tertiary amines of 5 to 6 carbon atoms in the molecule in general have the required inverted solubility curve and a satisfactory selectivity factor. In some special cases amines having 4 or 7 carbon atoms may be employed.

We have found that the temperature properties of the solvent may be improved by employing a mixture of amines having relatively widely separated water solubility curves. By the proper selection of the relative amounts of the amines employed, a solvent having a predetermined extraction temperature and a predetermined extract phase breaking temperature may be tailor made.

In practice, the saline water is contacted with a suitable solvent of the type indicated above. The extract, containing the solvent and fresh water, is removed and then fed to a separator. There it is heated to cause the extract to separate into two immiscible liquids—water and solvent. Water is the bottom phase which is treated to remove residual amines and then removed as the product. The upper layer in the separator is solvent, which is recycled to the extraction step.

It is the main object of this invention to provide an improved solvent for the extraction of water of a lower salt content than the saline feed water.

A further object of this invention is to provide an improved solvent which may be tailor made to fit predetermined temperature requirements for the extraction of saline waters.

A further object of this invention is to provide an improved solvent for the extraction of saline waters consisting of a mixture of secondary and tertiary amines of relatively widely separated solubility curves.

In the drawing—

FIG. 3 is a graph showing the solubility curve of dimethylisopropylamine and diisopropylamine and of mixtures thereof;

FIG. 4 is a flow sheet of a simplified solvent extraction method for saline waters.

Figure 1:
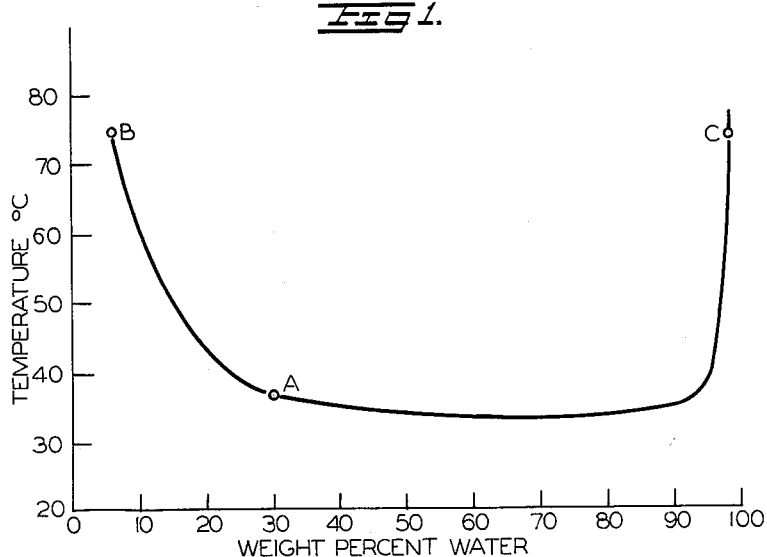
FIG. 1 is a graph showing the solubility curves of a typically good solvent.

FIG. 1 shows a graph of a typical solvent wherein the weight percent of water is plotted against temperatures. If we choose an extraction temperature of 38° C. the solvent will dissolve approximately 30% water (point A on the curve). At 75° C. the solution will be either 98% water or 8% water. In employing the solvent it is contacted with the saline solution at 38° C. At a lower temperature and a higher water content, increasing amounts of salt are dissolved. Experience has shown that a water content of the extract, in excess of 35–40%, usually causes an excess solution of salt in the solvent phase for optimum operation. The solution is then heated to 75° C., forming an aqueous phase and a solvent phase.

Figure 2:
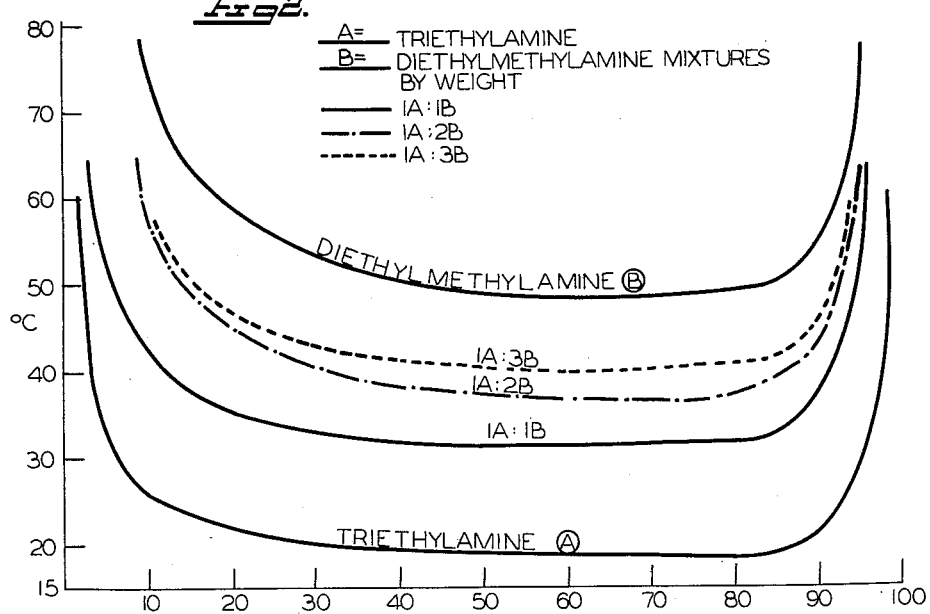
FIG. 2 is a graph showing the solubility curves of triethylamine and diethylmethylamine and mixtures thereof.

It has been found that using a pure solvent to extract fresh water from saline solutions, as indicated in FIG. 1, the extracting and separatory temperatures are fixed within narrow limits by the physical properties of the solvent. It is desirable for optimum efficiency to be able to select these critical temperatures on the basis of available sources of heat and cooling, rather than have them fixed by the physical properties of the solvent. Even though a solvent may have properties which are consistent with the normal temperatures of the locality at one season, at another season of the year the change in average temperature would require a change of solvent. We have found that by employing a mixture of solvent having rather widely separated solubility curves, any intermediate extraction temperature may be selected simply by altering the ratio of solvents in the mixture. This is shown by FIGS. 2 and 3. In FIG. 2, the solubility curves of triethylamine (curve A) and diethylmethylamine (curve B), and mixtures thereof, are shown. Curve A is the lower curve and curve B the higher. The intermediate curves are mixtures of these two solvents in the weight ratio of 1:1, 1:2 and 1:3. As would be expected, the greater the amount of diethylmethylamine present, the higher the curve.

Similarly, FIG. 3 shows the curves obtained with dimethylisopropylamine, diisopropylamine and a 2:1 mixture of diisopropylamine and dimethylisopropylamine.

Referring particularly to FIG. 2, at an extraction temperature of 20° C., triethylamine (curve A) will dissolve approximately 35% water. On raising the temperature to 35° C. all except about 3% of the water is phased out. Considering diethylmethylamine (curve B), the extract phases would contain about 35% water at about 53° C., and all but about 7% of the water would phase out at about 67° C.

As shown in the curve, a 1:1 ratio would allow 35% extraction at about 32° C., and satisfactory phasing out at 47° C. It is obvious that a solvent may be prepared to fit the particular climatic or other temperature operating conditions encountered.

In general, tertiary and secondary amines which have inverted solubility characteristics may be employed as components of the mixture. By selecting two or more which have differing solubility curves, it is possible to mix them in suitable proportions to give the properties desired. Especially useful for this purpose are amines of the general formula

wherein $R_1$ may be hydrogen or alkyl, and $R_2$ and $R_3$ may be alkyl or $C_3$ or $C_4$ alkenyl radicals such as allyl, methyl allyl, and butenyl, and the total number of carbon atoms in the molecule is usually 5 or 6, although compounds having 4 or 7 carbons are useful in special cases.

Among the amines which may be employed in mixed solvents of the process are:

Triethylamine
Methylethylisopropylamine
Methylethyl-n-propylamine
Dimethyl-secondary-butylamine
Dimethyl-tertiary-butylamine
Dimethylisobutylamine
Dimethyl-n-butylamine
Methyldiethylamine
Dimethylallylamine
Dimethyl-n-propylamine
Dimethylisopropylamine
Diisopropylamine
Di-n-propylamine
Di-allylamine
N-methyl-n-amylamine
N-ethyl-n-butylamine
N-ethyl-sec-butylamine
N-ethyl-tertiary-butylamine
N-ethyl-n-propylamine
N-ethyl-isopropylamine
N-methyl-n-butylamine
N-methyl-sec-butylamine
N-methyl-iso-butylamine
N-methyl-tertiary butylamine
Dimethyl, 1,1-dimethylpropylamine
Dimethyl, 1-methyl butylamine FIG. 4 is a diagrammatic flow diagram illustrating the method. Valves, pumps, heaters, and similar apparatus elements have been omitted for the sake of simplicity, but it is to be understood that these are to be provided as required, as will be apparen to those skilled in the art.

Referring to the drawing, saline water is fed through line 1 into extractor 2 and passes downwardly therethrough in a countercurrent direction to solvent entering through line 3 at the bottom of the extractor. Raffinate is removed through line 4 and goes to a solvent recovery stage 23, as will be explained hereinafter. Extract is removed overhead from the extractor 2 through line 5. Reflux water may be admitted, if desired, through line 6 at the top of the extractor.

The extract phase in line 5 is split into two streams 7 and 8, which are led, respectively, into heat exchangers 9 and 10 where the extract is in a heat exchange relationship with solvent and water from the phase separating step as will be described shortly. The extract streams 11 and 12 leaving heat exchangers 9 and 10 respectively, come together again in line 13 and pass into heat exchanger 14, where the extract phase is brought up to the required temperature by steam or other heating medium. The heated extract, now separated into a water phase and a solvent phase, is now led through line 16 into a phase separator 15, where gravity separation takes place. Solvent is removed overhead from separator 16 through line 17 and passes through heat exchanger 9 where it is in heat exchange relationship with extract from extractor 2. The solvent then passes through line 18 to heat exchanger 19 where the solvent stream may be cooled, if required. Solvent leaves cooler 19 through line 3 and enters the extractor as shown.

Water is removed from the bottom of the separator through line 20 and is led into heat exchanger 10 where it is in heat exchange relationship with extract entering through line 8. The water leaves heat exchanger 10 through line 21 and is led to solvent recovery stage 22. A portion of the water in line 21 may be led as reflux through line 6 into extractor 2.

Solvent recovery stage 22 is similar to the raffinate solvent recovery stage 23, and both will be described together. The solvent containing solution, i.e. product water or raffinate, is steam stripped to remove essentially all of the solvent (1 p.p.m. or less). The remaining product water is then passed over charcoal or other adsorbent such as silica gel or adsorbent clay to remove the remaining small amounts of solvent. The adsorbent is regenerated when required and the amines may be recovered.

Alternatively, the solvent may be removed from the product water and raffinate by extraction with a liquid miscible with the solvent but immiscible with water, as for example hexane or other similar hydrocarbons. All the above means for recovery of the solvent are well known to the art and need not be further described.

Solvent from recovery stages 22 and 23 is fed through lines 24 and 25 respectively to line 26 and thence into phase separator 16. Product water is removed from recovery stage 22 via line 27, and brine is removed from recovery stage 23 via line 28.

In the process described the solvent used is lighter than water. However, if a solvent heavier than water is employed, the places of admission and removal of solvent and feed from the extractor are reversed.

The following example illustrates the results obtained using mixed amines as the solvent:

The extraction apparatus employed consisted of a 2 inch column packed with five feet of ¼ inch Raschig rings. Feed water having a salinity content of 4560 p.p.m. was pumped in at the top and mixed methyldiethylamine, triethylamine solvent in a ratio of 1.5 to 1 by weight respectively, was admitted at the bottom. An extract temperature of 41° C. was maintained by electrical heating tape wrapped around the column. The rate was 66 ml. per minute of water contacted with 264 ml. per minute of recycled solvent. 306 ml. per minute of extract was removed overhead and 28 ml. raffinate was removed from the bottom. The extract was heated to a temperature of 60° C. to break phase, and product water at a rate of 42 ml. per minute was produced. Recovered solvent was recycled to the extraction step.

The results are summarized in Table 1 as follows:

TABLE 1

Pilot Plant Run on Mixture of Methyldiethylamine and Triethylamine 1.5 parts of diethylmethylamine
1 part triethylamine

|  | Percent Amine | Chloride, as Percent Sodium Chloride | Sodium, as Percent Sodium Chloride |
|---|---|---|---|
| Feed | 0 | 0.456 | 0.456 |
| Raffinate | 9.36 | 0.991 | 1.0 |
| Product | 5.32 | 0.029 | 0.04 |

5 parts of feed produced 3 parts of product and 2 parts of raffinate.

The variation in the sodium chloride content, computed on the basis of chloride and sodium content respectively, is due to the formation of amine hydrochlorides by the amines in salt water solution. This taking up of chlorine by the amines significantly reduced the chlorine concentration in the product water.

From the above description it is apparent that by employing appropriate solvents, extraction of water from a saline solution can be carried out at any desired temperature, and separation of water from the solvent achieved at a temperature of about 15° C. higher. This permits efficient operation from the standpoints of both material stability and over-all economics.

Although the invention has been described primarily with regard to the production of water from the extract phase, it is also useful for low temperature dewatering in the production of concentrates from the raffinate phase.

It is apparent from a reading of the foregoing specification that the invention is susceptible to various changes and modifications without departing from the spirit and scope thereof.

We claim:

1. In the method for removing water having a lessened salt content from saline waters by solvent extraction, wherein the water is removed in an extract phase and a more concentrated salt solution forms the raffinate phase, and wherein the extract phase is heated to cause the water therein to separate out, the improvement which comprises using as the solvent a mixture of amines, at least two amines having inverse solubility curves with water and having the formula

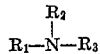

wherein $R_1$ is a member of the class consisting of hydrogen and alkyl, $R_2$ and $R_3$ are members of the class consisting of alkyl, and alkenyl radicals having 3 to 4 carbon atoms, the total number of carbon atoms in each individual amine being 4 to 7, inclusive, the amines composing the solvent mixture having relatively widely separated solubility curves, whereby the relative proportions of the component amines in said solvent may be so selected as to give a predetermined extraction temperature and a predetermined phase separation temperature of the extract.

2. In the method for removing water having a lessened salt content from saline waters by solvent extraction, wherein the water is removed in an extract phase, and a more concentrated salt solution forms the raffinate phase, and wherein the extract phase is heated to cause the water therein to separate out, the improvement which comprises using as the solvent a mixture of triethylamine and diethylmethylamine, the said amines having relatively widely separated solubility curves, whereby the relative proportions of the component amines in said solvent may be so selected as to give a predetermined extraction temperature and a predetermined phase separation temperature of the extract.

3. The process of claim 2, wherein the ratio of triethylamine to diethylmethylamine is 1:1 by weight.

4. The process of claim 2, wherein the ratio of triethylamine to diethylmethylamine is 1:2 respectively, by weight.

5. The process of claim 2, wherein the ratio of triethylamine to diethylmethylamine is 1:3 respectively, by weight.

6. The process of claim 2, wherein the ratio of triethylamine to methyldiethylamine is 1:1.5 respectively, by weight.

7. The process of claim 2, wherein the solvent mixture is diisopropylamine and dimethylisopropylamine.

8. The process of claim 7, wherein the ratio of diisopropylamine and dimethylisopropylamine is 2:1 respectively, by weight.

9. A composition of matter suitable for the solvent extraction of saline waters, consisting of a mixture of at least two amines having inverse solubility curves with water, said amines having the structural formula

wherein $R_1$ is a member of the class consisting of hydrogen and alkyl, $R_2$ and $R_3$ are members of the class consisting of alkyl, and alkenyl having 3 to 4 carbon atoms, the total number of carbon atoms in the individual amines being from 4 to 7 inclusive, the said amines having relatively widely separated solubility curves.

10. The composition of claim 9, wherein the mixture of amines consists of triethylamine and diethylmethylamine.

11. The composition of claim 9, wherein the mixture of amines consists of diisopropylamine and dimethylisopropylamine.

12. The composition of claim 10, wherein the ratio of triethylamine to diethylmethylamine is 1:1 by weight.

13. The composition of claim 10, wherein the ratio of triethylamine to diethylmethylamine is 1:2 respectively, by weight.

14. The composition of claim 10, wherein the ratio of triethylamine to diethylmethylamine is 1:3 respectively, by weight.

15. The composition of claim 10, wherein the ratio of triethylamine and methyldiethylamine is 1:1.5 respectively, by weight.

16. The composition of claim 11, wherein the ratio of diisopropylamine and dimethylisopropylamine is 2:1 respectively, by weight.

References Cited in the file of this patent

Saline Water Conversion Report for 1959, U.S. Dept. of Interior, January 1960.

Chem. and Eng. News, Feb. 2, 1956, pp. 40–42, vol. 37, No. 5.